United States Patent
Castellani (10) Patent No.: US 9,737,166 B2
(45) Date of Patent: Aug. 22, 2017

(54) BEVERAGE PRODUCING SYSTEM AND CAPSULE

(71) Applicant: KONINKLIJKE PHILIPS N.V., Eindhoven (NL)

(72) Inventor: Andrea Castellani, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 39 days.

(21) Appl. No.: 14/391,519

(22) PCT Filed: Mar. 26, 2013

(86) PCT No.: PCT/IB2013/052408
§ 371 (c)(1),
(2) Date: Oct. 9, 2014

(87) PCT Pub. No.: WO2013/153473
PCT Pub. Date: Oct. 17, 2013

(65) Prior Publication Data
US 2015/0245733 A1  Sep. 3, 2015

Related U.S. Application Data

(60) Provisional application No. 61/622,571, filed on Apr. 11, 2012.

(51) Int. Cl.
| A47J 31/40 | (2006.01) |
| A47J 31/06 | (2006.01) |
| B65D 85/804 | (2006.01) |

(52) U.S. Cl.
CPC ........ *A47J 31/407* (2013.01); *A47J 31/0673* (2013.01); *B65D 85/8043* (2013.01)

(58) Field of Classification Search
None
See application file for complete search history.

(56) References Cited

U.S. PATENT DOCUMENTS

| 2005/0103204 A1* | 5/2005 | Halliday | A47J 31/446 99/295 |
| 2006/0236871 A1* | 10/2006 | Ternite | B65D 85/8043 99/295 |
| 2010/0206177 A1 | 8/2010 | Ricotti | |
| 2010/0303964 A1* | 12/2010 | Beaulieu | B65D 85/8043 426/77 |
| 2011/0111098 A1 | 5/2011 | Ricotti | |
| 2011/0189350 A1 | 8/2011 | Van Belleghem | |

(Continued)

FOREIGN PATENT DOCUMENTS

| DE | 19950154 A1 | 4/2001 |
| EP | 2263501 A1 | 12/2010 |
| WO | 9219019 A1 | 10/1992 |

(Continued)

*Primary Examiner* — Viren Thakur
*Assistant Examiner* — Thanh H Nguyen (57) ABSTRACT

A capsule that contains at least one ingredient for preparing an edible product by flowing water therethrough includes a water-inlet wall and a product-outlet wall. The product-outlet wall has at least a first, pierceable wall portion, and a second, pierceable wall portion. The second wall portion is recessed with respect to the first wall portion. The product-outlet wall is asymmetrical with respect to a longitudinal axis of symmetry of the capsule.

17 Claims, 3 Drawing Sheets

(56) References Cited

U.S. PATENT DOCUMENTS

2014/0069280 A1    3/2014   Frydman

FOREIGN PATENT DOCUMENTS

| WO | 0160712 A1 | 8/2001 |
| WO | 2009084059 A1 | 7/2009 |
| WO | 2010066766 A2 | 6/2010 |
| WO | 2010089106 A1 | 8/2010 |

* cited by examiner

BEVERAGE PRODUCING SYSTEM AND CAPSULE

This application is the U.S. National Phase application under 35 U.S.C. §371 of International Application No. PCT/IB2013/052408, filed on Mar. 26, 2013, which claims the benefit of U.S. Provisional Application No. 61/622,571 filed on Apr. 11, 2012. These applications are hereby incorporated by reference herein.

TECHNICAL FIELD

The present disclosure refers to capsules for producing a beverage, or more generally an edible product, by flowing hot and possibly pressurized water through the capsule, which contains at least one or more ingredients for the preparation of edible product.

BACKGROUND ART

Beverage producing systems using disposable beverage cartridges of capsules are commonly used for preparing coffee-based beverages or other edible products. A capsule is usually introduced into a brewing chamber, pierced on the top and on the bottom and the beverage is extracted by flowing hot and pressurised water through the capsule. Depending upon the kind of the capsules used, the water pressure and/or temperature or the flow rate, as well as upon the ingredients contained in the capsule, beverages of different quality and nature can be obtained.

Brewing espresso coffee requires flowing hot and pressurized water through the capsule containing coffee powder. Water is usually fed into the capsule at reduced flow rate and at around $12/15$ bars. Such a high pressure value is required to form the cream on top of the espresso coffee.

So-called fresh-brew coffee or "American coffee" is usually produced by flowing a large amount of water at reduced or zero pressure across a coffee powder bed.

Usually coffee producing devices are designed to produce either espresso coffee or so called American coffee or fresh brew coffee. Attempts have been made to provide devices capable of forming different kinds of coffee-based beverages. There is however still a need for a system which is capable of producing beverages having variable organoleptic characteristics using the same single-serving package, for example a capsule or cartridge.

US-A-2011/0111098 discloses a brewing system including a capsule having a bottom wall with a groove. The groove is asymmetrically arranged with respect to the capsule and is intended for positioning the capsule in only one pre-determined angular position in a brewing chamber. The brewing chamber comprises two identical piercers arranged symmetrically with respect to the brewing chamber axis and off-axis, i.e. distanced from said axis. Each piercer is in fluid communication with a respective beverage dispensing duct, said two dispensing ducts being independent and separated from one another. The planar bottom wall portion of the capsule has an indentation in a position corresponding to one or the other of said two piercers. Thus, upon insertion of the capsule in the brewing chamber, a fluid communication will be established between the capsule interior and only one of said piercers. Two kinds of capsules can be used with the same brewing unit, differing by content and position of the indentation. Either one or the other piercer and corresponding dispensing duct will be used, depending upon the content of the capsule, so that different beverages (e.g. tea and coffee) can be produced with the same device. This prevents contamination of one beverage by the residues of the other beverage in the dispensing duct, since the dispensing ducts are independent and selectively used depending upon the shape of the capsule bottom, i.e. depending upon the position of the indentation on the bottom of the capsule.

BRIEF DESCRIPTION OF THE INVENTION

According to a first aspect, the present disclosure relates to a capsule containing at least one ingredient for preparing an edible product by flowing water there through, which can be used in different modes such that different beverages can be obtained by means of the same capsule, depending upon the position in which the capsule is introduced in the brewing chamber. The bottom of the capsule is asymmetrically shaped and such that the capsule is apertured either upon closure of the brewing chamber or only after the capsule has been pressurized and the ingredients therein pre-infused. The brewing cycle can be thus performed at low or high water pressure, selectively, depending upon the capsule position in the brewing chamber, offering the user the possibility of choosing his preferred beverage using the same capsule and the same beverage producing device.

According to some embodiments, the capsule is provided, comprising a water-inlet wall, a product-outlet wall and a side wall. The product-outlet wall has at least a first, pierceable wall portion, and a second, pierceable wall portion. A side portion extends between the water-inlet wall and the product-outlet wall. The second wall portion is recessed with respect to the first wall portion. I.e. the distance between the second wall portion and the water-inlet portion is less than the distance between the first wall portion and the water-inlet portion. Moreover, the product-outlet wall is asymmetrical with respect to a longitudinal axis of said capsule. As will become apparent from the following description, such a capsule can be used in a brewing chamber in order to produce different kinds of beverages, depending upon the position taken by the capsule in the brewing chamber.

In particularly advantageous embodiments, the second wall portion extends in a central area of said product-outlet wall. Advantageously, the position of the second wall portion can be such that the longitudinal axis of said capsule intersects said second wall portion. The longitudinal axis of the capsule shall be understood as the longitudinal axis of symmetry of the capsule. With this arrangement, if a piercing member is provided in the brewing chamber in a substantially central position, the recessed second wall portion of the capsule will always be located in front of such centrally located piercing member, irrespective of the angular position taken by the capsule in the brewing chamber. The piercing member and the capsule can be dimensioned such that the centrally located piercing member will pierce the bottom of the capsule and allow the product to flow there through only once the second, recessed wall portion of the capsule bottom has deformed sufficiently under the water pressure building up in the interior of the capsule, said second wall portion being designed to expand under pressure.

In practice, the capsule can thus have two alternative positions of use, defined by the mutual position of said first wall portion and said second wall portion. The first wall portion and said second wall portion can be arranged side-by-side along a transverse direction. The two alternative positions of use are thus defined by said transverse direction and differ from one another by a rotation of 180°, i.e. the second position of use is rotated by 180° with respect to the first position of use and vice-versa.

The product-outlet wall of the capsule can comprise additional wall portions, e.g. an annular outer wall portion surrounding the first wall portion and the second wall portion. However, preferably the entire product-outlet wall is formed by said first wall portion and said second wall portion, and the second wall portion is preferably entirely recessed with respect to said first wall portion. The second, recessed wall portion does not require to be planar. Rather, it can be curved and extend gradually away from the first wall portion. The second, recessed wall portion will thus have a concave shape, which will gradually expand under the pressure building up inside the capsule during the brewing cycle, in one of the two alternative brewing modes, the capsule is intended for.

The first wall portion can be substantially orthogonal to the longitudinal axis of the capsule.

The water-inlet wall can be water pervious. In preferred embodiments, however, also the water-inlet wall is a pierceable, gas and liquid impervious wall, so that the capsule will not require an outer sealing bag.

The two alternative brewing positions which the capsule can take in the brewing chamber can be selected by the user based on the shape of the capsule bottom, i.e. the shape of the product-outlet wall. However, in preferred embodiments, the capsule comprises a recognition element, arranged in an asymmetrical position with respect to the longitudinal axis of the capsule. The recognition element assists the user in correctly positioning the capsule in the brewing chamber, selectively in one or the other of the two alternative positions. A recognition element can comprise simple marks, indicia or other visually detectable indications provided on the capsule. Such visually detectable indications are preferably provided on a part of the capsule which remains visible once the capsule has been introduced in the brewing chamber and before closing the brewing chamber. For example, the visually detectable indications can be provided on the top of the capsule, i.e. on the water-inlet wall or on a rim surrounding said wall. A visually detectable indication can also be provided by the shape of the rim. For example the rim can be asymmetrical.

In further embodiments the recognition element can be a machine-detectable element, capable of being detected automatically by the brewing machine or device. A machine-detectable recognition element can be provided in any suitable position around the capsule, on the top face, bottom face or side wall.

Preferably the recognition element is both visually detectable by a user and machine-detectable by the brewing device. The user will thus correctly position the capsule in the brewing chamber and the device will automatically recognize the selected position in which the capsule has been placed in the device. For example, the recognition element can comprise a tag projecting sideways from the capsule. In some embodiments the recognition element is formed on a rim surrounding said water-inlet wall. The rim can e.g. be arranged asymmetrically with respect to the longitudinal axis of the capsule. For instance, if the capsule is circular in a plan view, the rim can be elongated transversely to the capsule axis and project sideways from the capsule.

In advantageous embodiments, the recognition element projects on one side of the capsule corresponding to one of said first wall portion and said second wall portion. The two wall portions can be arranged side-by-side along a transverse direction, and the recognition element can be aligned with said first wall portion and said second wall portion in said transverse direction.

According to a further aspect, the present disclosure also refers to a system for preparing an edible product, such as in particular, but not exclusively a beverage, for instance a coffee-based beverage, said system comprising:
- a capsule comprising a water-inlet wall and a product-outlet wall opposite to one another; wherein the product-outlet wall has at least a first, pierceable wall portion, and a second, pierceable wall portion, the second wall portion being recessed with respect to the first wall portion; and wherein the product-outlet wall is asymmetrical with respect to a longitudinal axis of the capsule;
- a brewing chamber configured for selectively receiving the capsule in two alternative positions, and comprising at least one first, shorter piercing member and one second, longer piercing member, said first piercing member being arranged to pierce the first wall portion when said capsule is introduced in the brewing chamber with the first wall portion facing said first piercing member; and the second piercing member being arranged to pierce said second wall portion allowing the edible product to flow out of the capsule when the second wall portion expands under a water pressure in the capsule.

The first piercer, therefore, pierces the bottom of the capsule in the area of the first wall portion upon closure of the brewing chamber, before starting water delivery through the capsule. In this manner, extraction of the ingredients in the capsule is performed at a reduced pressure, virtually even at ambient pressure. As a matter of fact, as soon as water starts to be fed to the capsule, the edible product will start flowing through the already pierced product-outlet wall of the capsule.

If the capsule is arranged such that the first piercer does not pierce the first wall portion, the second piercer will not be able to sufficiently penetrate through the product-outlet wall upon closure of the brewing chamber. Only once the brewing cycle starts and the pressure inside the capsule builds up, the product-outlet wall of the capsule will expand sufficiently to cause penetration of the second piercing element there through such as to cause the edible product to flow out of the capsule.

According to a further aspect, the present disclosure relates to a device for preparing an edible product, comprising:
- a brewing chamber arranged for receiving a capsule containing at least one ingredient for preparing an edible product by flowing water through the capsule;
- at a first end wall of said brewing chamber, at least one water inlet duct for delivering water in said brewing chamber;
- at a second end wall of the brewing chamber, at least one product outlet duct for dispensing said edible product from the brewing chamber;
- at least one first, shorter piercing member and one second, longer piercing member, both projecting from the second end wall towards the interior of the brewing chamber.

In preferred embodiments the first, shorter piercing member and the second, longer piercing member are arranged asymmetrically with respect to an axis of symmetry of said brewing chamber. For instance, the second, longer piercing member is arranged in a central position of said second end wall and preferably on or near the axis of symmetry of the brewing chamber.

In preferred embodiments the device comprises a sensor for detecting an insertion position of said capsule in said brewing chamber. Using a sensor allows automatic selection of one or more parameters of the brewing cycle, as a function of the capsule position, making the device more user-friendly.

A sensor shall be understood as any device, instrument, apparatus or component suitable for detecting the capsule position. In some embodiments the sensor comprises or consists of a micro switch. Other sensors can be used, e.g. a capacitive sensor or an optical sensor or the like.

The device can comprise a pump for pumping pressurized water in the brewing chamber, and a control device for controlling at least one pump parameter as a function of a beverage selection. The parameter can be set manually by the user, e.g. through a user interface. If a sensor is provided, the parameter can be selected automatically.

In some embodiments the brewing chamber comprises a recess for receiving a capsule rim, and the sensor can be arranged at said recess for detecting an angular position of insertion of said capsule in said brewing chamber.

According to a further aspect, the subject matter disclosed herein also comprises a method for producing an edible product with a capsule and a device as described above, said method comprising the steps of:

introducing the capsule in the brewing chamber selectively in a first position, wherein the first wall portion of the capsule bottom is pierced by the first piercing member, or in a second position, wherein the first wall portion is arranged opposite the first piercing member;

closing the brewing chamber;

delivering water to the brewing chamber selectively at a lower pressure or at a higher pressure depending upon the position of introduction of the capsule in the brewing chamber.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following description refers to an application of the invention in a coffee machine, but it should be understood that the invention can be embodied in other different kinds of beverage producing machines or also in different kinds of apparatus, machines or devices for handling edible products.

In the following description reference will be made to a capsule for producing a coffee beverage and to a device for preparing such a coffee beverage. It should however be understood that the invention could be embodied also in a different device for producing other edible products by means of flowing water through a single serving capsule, whenever the need arises to control one or more flowing parameters based on the final result to be obtained, for example the final organoleptic characteristics of the beverage.

Figure 1:
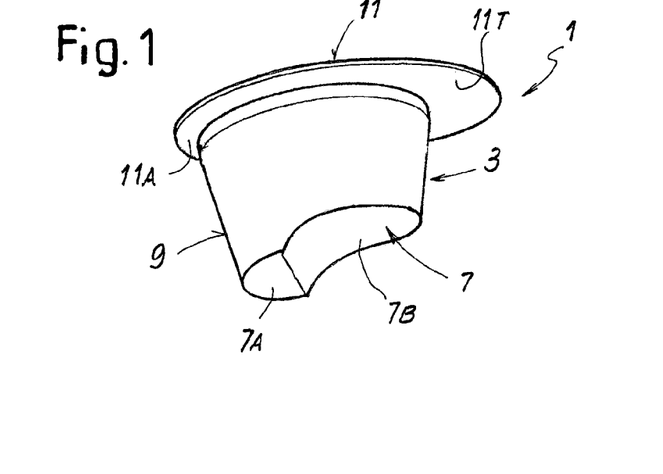
FIG. 1 illustrates a perspective view of a capsule according to the present disclosure.
Figure 2:
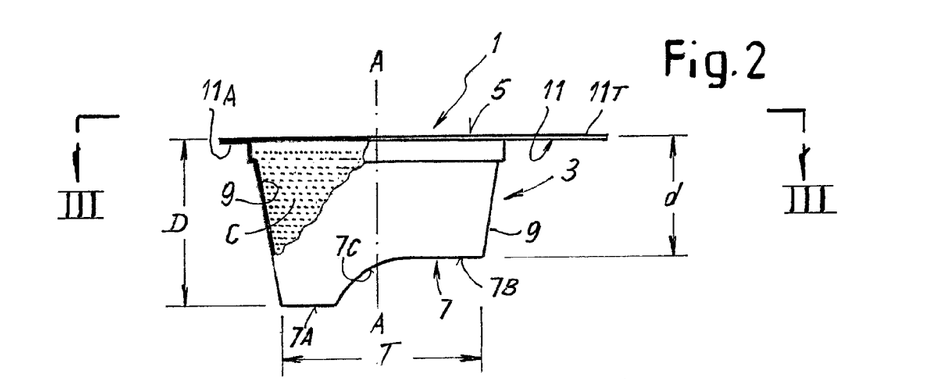
FIG. 2 illustrates a side-view of the capsule of FIG. 1.
Figure 3:
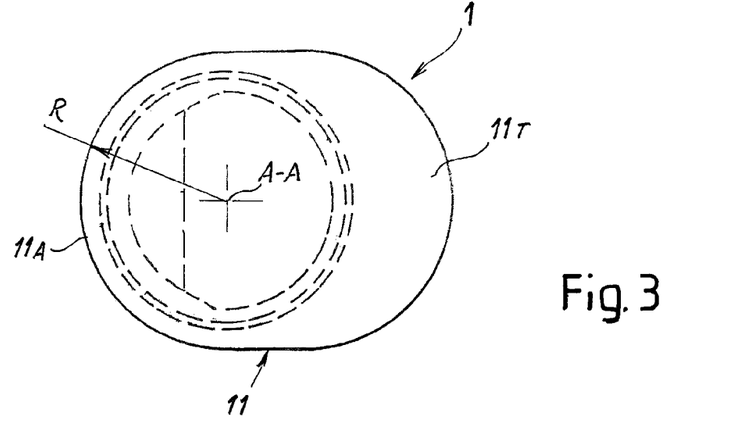
FIG. 3 illustrates a top view according to line of FIG. 2.

FIGS. 1 to 3 illustrate a capsule 1, for example containing coffee powder. The capsule 1 has a main body 3 with a first wall 5 and a second wall 7 opposite to one another. The first wall 5 will be designated here below as a water-inlet wall, because the brewing water required for extracting the beverage is fed through said first wall 5. The second wall 7 will be designated here below as the product-outlet wall, since the edible product, i.e. the coffee beverage is dispensed through said second wall 7 towards a beverage dispensing nozzle, for example. In the embodiment illustrated in the drawings the water-inlet wall is air and liquid impervious and pierceable, i.e. one or more water passages can be formed there through by means of a piercer which punctures the wall at the time of use.

A side wall 9 extends from the water-inlet wall 5 to the product-outlet wall 7 along a capsule axis A-A. In the example illustrated in FIGS. 1 to 3, the side wall 3 has a broadly frustum-conical shape with a circular cross-section and is therefore in the form of a solid of revolution having an axis of symmetry coinciding with the capsule axis A-A. In other embodiments the side wall 3 could be cylindrical, with a circular or non-circular cross-section or else conical with a non-circular cross-section. In yet further embodiments the capsule can have a frustum pyramidal shape, e.g. with a square or rectangular cross-section, in which case the side wall will be frustum-pyramidal.

Around the water-inlet wall 5 the capsule 1 is provided with a rim 11. In the embodiment shown in the drawings the rim 11 is asymmetrical with respect to the capsule axis A-A. More specifically, the rim 11 has a first portion 11A with a constant radius R developing around approximately 180°. Along the remaining approximately 180° the rim 11 extends sideways forming a tag 11T which projects asymmetrically from the water-inlet wall 5 for the purposes which will become clearer later on.

The product-outlet wall 7 of the capsule 1 is shaped such as to form a first wall portion 7A and a second wall portion 7B. The first wall portion 7A has a distance D from the water-inlet wall 5. The second wall portion 7B is recessed with respect to the first wall portion 7A, i.e. the distance d between the second wall portion 7B and the water-inlet wall 5 is smaller than the distance D between the same water-inlet wall 5 and the first wall portion 7A. The product-outlet wall 7 is air and liquid impervious. Both the first wall portion and the second wall portion are pierceable, i.e. they can be apertured by a piercer at the time of use.

The two wall portions 7A and 7B are arranged side by side and are aligned along a direction T corresponding to the direction along which the tag 11T extends sideways of the water-inlet wall 5. The two wall portions 7A and 7B are therefore asymmetric with respect to the capsule. As mentioned above, in the embodiment illustrated in the drawings the capsule has a broadly conical side surface with a circular cross section. The two wall portions 7A and 7B are arranged asymmetrically with respect to the axis A-A of the conical capsule side wall 9.

In the embodiment shown in the drawings the first wall portion 7A is planar. The second wall portion 7B is partly planar and merges in a substantially cylindrical surface 7C which extends towards the wall portion 7A. Different shapes of the product-outlet wall 7 are possible, provided that two wall portions are defined, one recessed with respect to the other, i.e. with a wall portion more distant and a second portion less distant from the water-inlet wall 5, said two wall portions being arranged asymmetrically with respect to the capsule axis A-A and aligned along the extension of the tag 11T, if present.

The capsule 1 can be manufactured with a water and gas impervious material, such as plastic, aluminum or a laminate material, for example an aluminum foil coated with a plastic material. The ingredients contained in the capsule, for example coffee powder C, will be protected against oxygen, humidity and other degrading agents, such that an additional external sealing package of the capsule can be dispensed with.

In other embodiments the water-inlet wall 5 could have a water pervious structure, for example it could be made of a non-woven, paper or similar material, or else it could be formed by an apertured. The product-outlet wall 7 is anyhow water impervious.

Figure 4:
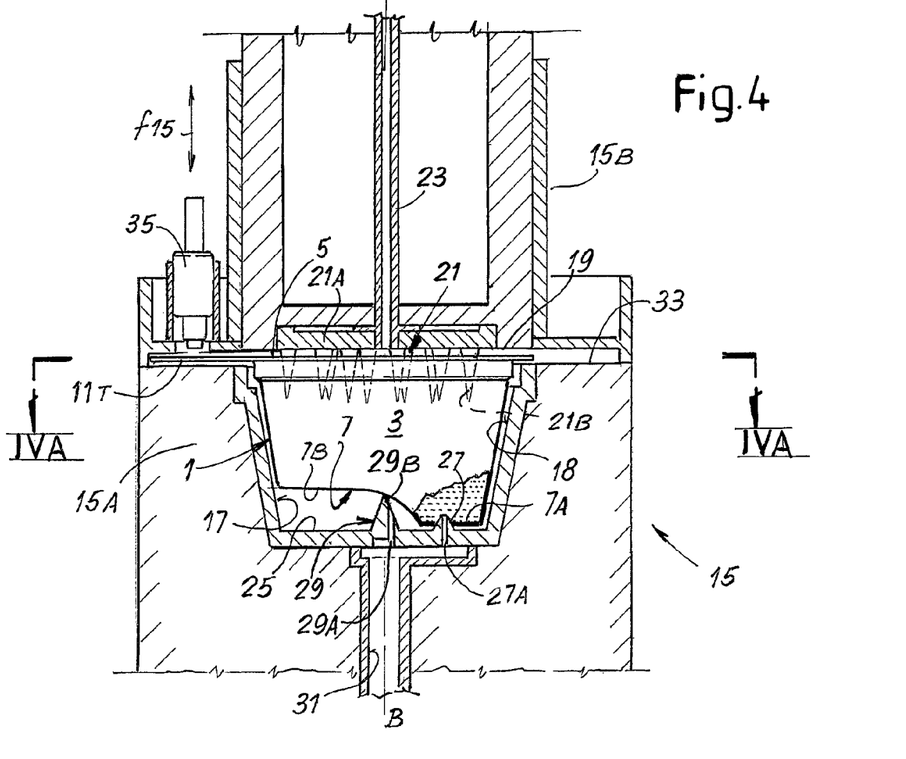
FIG. 4 illustrates a brewing chamber with a capsule in a first brewing position.
Figure 5:
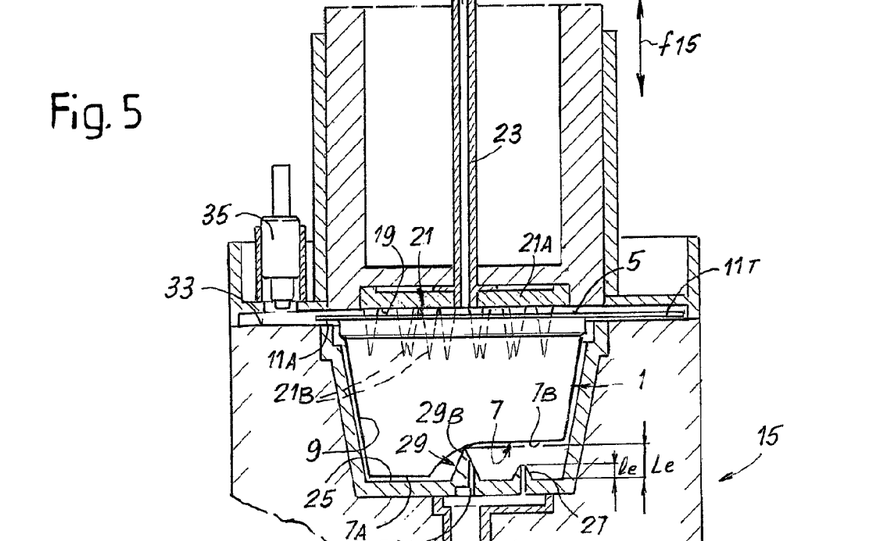
FIG. 5 illustrates the brewing chamber of FIG. 4 with a capsule in a second brewing position.

The capsule 1 can be used in a beverage preparing system, e.g. comprising a brewing chamber or a different beverage preparing unit. FIGS. 4 and 5 illustrate an exemplary embodiment of a beverage preparing unit comprising a brewing chamber, designated 15. In the exemplary embodiment illustrated in the drawings, the brewing chamber 15 comprises a first brewing chamber portion 15A and a second brewing chamber portion 15B. The two brewing chamber portions 15A and 15B are movable one with respect to the other in order to open the brewing chamber, introduce the capsule therein, closing the brewing chamber and extracting the beverage. Other brewing chamber forms can be used.

In the schematic representation of FIGS. 4 and 5 the lower brewing chamber portion 15A has a capsule recess 17, wherein the capsule 1 can be introduced. Loading of the capsule 1 in the capsule recess 17 can be obtained manually or with an automatic system.

The capsule recess 17 can be closed by the brewing chamber portion 15B being movable according to double arrow 15B as schematically indicated in the drawings. In this embodiment the lower brewing chamber portion 15A is fixed with respect to a supporting structure. Different arrangements can be used, e.g wherein the lower brewing chamber portions 15A is movable and the upper brewing chamber portion 15B is fixed, or wherein both brewing chamber portions 15A and 15B are movable one with respect to the other. Also the arrangement of the two brewing chambers can be different. E.g. The could be aligned according to a horizontal rather than to a vertical direction, or else they could be arranged according to an inclined direction.

The brewing chamber portion 15B is provided with a first end wall 19, comprising an upper piercer 21. The upper piercer 21 is schematically represented as a disc-shaped plate 21A provided with a plurality of sharp projections or pins 21B designed to perforate or pierce the water-inlet wall 5. If the latter is made of a liquid pervious material, for example an apertured film, the piercer 21 can be dispensed with.

A water inlet duct 23 is associated with the brewing chamber portion 15B. The water inlet duct 23 is arranged such as to dispense water through the apertures formed in the water-inlet wall 5 of a capsule 1 positioned in the brewing chamber 15 upon closure of the brewing chamber.

The recess 17 is closed by a second end wall 25 of the brewing chamber, opposite the brewing chamber portion 15B.

At least two piercing members 27 and 29 are arranged at the bottom of the recess 17, i.e. projecting inwardly of the recess 17 from the second end wall 25. In the embodiment shown in FIGS. 4 and 5, the first piercing member 27 and the second piercing member 29 both have a central port 27A and 29A respectively. Both ports 27A and 29A are in fluid communication with a coffee dispensing spout 31. In a different embodiment, not shown, each piercing member can be provided with an outer side groove forming a flow passage for the beverage, rather than with a central port.

The first piercing member 27 and the second piercing member 29 are arranged asymmetrically with respect to a center axis B-B of the brewing chamber. More specifically, the first piercing member 27 is further away from the axis. B-B than the second piercing member 29. In the embodiment shown in the drawings, the second piercing member 29 is arranged coaxially with the brewing chamber axis B-B and the first piercing member 27 is arranged in an intermediate location between a peripheral wall 18 of the recess 17 and the center axis B-B of the brewing chamber 15.

Moreover, the first piercing member 27 has a length le which is smaller than the length Le of the second piercing member 29. Stating it differently, the first piercing member 27 projects inside the recess 17 of the brewing chamber 15 to a lesser extent than the second piercing member 29.

This arrangement of the piercing members 27 and 29 in combination with the asymmetrical shape of the product-outlet wall 7 of the capsule 1 lead to the possibility of preparing a beverage under different brewing conditions using the same capsule, as it will be described in more detail here below.

The capsule 1 can be introduced in the recess 17 of the brewing chamber 15 in two alternative positions as can be appreciated comparing FIGS. 4 and 5. In FIG. 4 the capsule 1 is introduced in the brewing chamber in such an orientation that the first wall portion 7A faces the first piercing member 27. Upon closure of the brewing chamber 15 the capsule 1 is pressed into the recess 17 and the wall portion 7A is pushed against the first piercing member 27. As shown in FIG. 4, therefore, upon closure of the brewing chamber the bottom of the capsule 1 is perforated by the first perforating member 27 before starting the brewing cycle.

Conversely, if the capsule 1 is introduced in the brewing chamber in an angularly shifted position, i.e. rotated by 180° around its own axis A-A with respect to the position shown in FIG. 4, the capsule will take the position shown in FIG. 5, with the second wall portion 7B facing the first perforating member 27 and the first wall portion 7A contacting the second end wall 25 in an area devoid of any perforating member.

The extension of the second perforating member 29 and the position thereof with respect to the bottom of the capsule 1 is such that, irrespective of the angular position of the capsule 1 in the brewing chamber 15, it will form an aperture, through which the edible product can be dispensed, only once a sufficient pressure has built up in the capsule and has deformed the product-outlet wall 7 thereof. In the embodiment illustrated in the drawings the length of the second perforating member 29 and the capsule shape are such that the perforating member 29 does not perforate the second wall portion 7B before staring the brewing cycle. The length Le of the piercing member 29 and the shape of the capsule 1 are such that the piercing member 29 will not puncture or pierce the product-outlet wall 7 of the capsule before the latter becomes deformed under the water pressure building up in the capsule during brewing (see FIG. 5A).

In other embodiments, not shown, the length of the second piercing member 29 and/or the shape of the product-outlet wall 7 can be such that the second piercing member 29 touches or punctures the product-outlet wall 7 of the capsule 1, however without entirely perforating it, such that the capsule remains water impervious. In yet further embodiments, the shape and dimensions of the piercing member 29 and the shape of the capsule 1 can be such that the piercing member 29 pierces the wall portion 7B, but the product cannot flow through the aperture thus formed, until the bottom wall of the capsule deforms sufficiently under the pressure inside the capsule. This can be obtained e.g. with a piercing member 29, wherein the upper end of the port 29A is recessed with respect to the tip of the piercing member 29. The piercing member 29 illustrated in the drawings is shaped in such way. The inlet of the port 29A is recessed with respect to the tip 29B. Therefore, even if the piercing member 29 penetrates entirely through the thickness of the wall portion 7B, the tip 29B of the piercing member 29 would act as a sort of plug, preventing the product from flowing through the aperture thus formed in the wall portion 7B, until the capsule deforms sufficiently under the inner pressure.

The brewing cycle will be conducted differently depending upon the angular position taken by the capsule in the brewing chamber.

If the capsule is introduced in the position shown in FIG. 4, when the brewing cycle starts and water is pumped through the duct 23 into the capsule, the latter is already punctured by the first perforating member 27 and is water permeable, such that the pressure inside the capsule will not build-up beyond and water can flow at a relatively high flow rate and low pressure through the capsule.

This brewing mode is used whenever the user requires a beverage without cream or with only little cream on top, for example a fresh brew or "American" coffee.

Figure 5A:
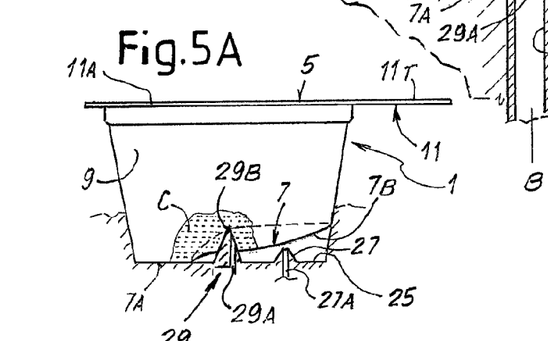
FIG. 5A illustrates a detail of the capsule during brewing in one brewing mode.

If, conversely, the capsule is introduced in the brewing chamber in the angular position shown in FIG. 5, when the brewing chamber 15 closes, the water-inlet wall 5 of the capsule 1 will be perforated by the perforator 21 but the product-outlet wall 7 will remain integral, i.e. not apertured. When water is pumped through the water inlet duct 23 into the capsule, pressure will build-up inside the capsule 1, since water cannot escape the capsule from the bottom. This causes a gradual deformation of the product-outlet wall 7 as shown in the detail of FIG. 5A.

Once the capsule 1 is sufficiently deformed, the second piercing member 29 will penetrate the product-outlet wall 7 and the beverage will flow out of the capsule 1 through the port 29A and possibly through the port 27A if the plastic deformation of the product-outlet wall 7 is sufficient to push the wall portion 7B beyond the tip of the first piercing member 27. In this case, therefore, brewing will be performed at a higher water pressure and lower flow rate, obtaining for example an espresso coffee with a top cream layer. In the embodiment illustrated in the drawings the product will start flowing through the port 29A only once the deformation of the wall portion 7B is sufficient to move beyond the inlet end of the port 29A. This ensures that a higher inner pressure can be achieved before the product starts flowing through the port 29A.

Thus, the same capsule 1 can be used in two different brewing modes obtaining two different beverages.

In some embodiments a self-adaptive water pump can be used, i.e. a pump which has a head-flow characteristic curve which results in the water flow and pressure being modified depending upon the pressure losses along the hydraulic circuit, to an extent sufficient to deliver water at the correct rate and pressure in both brewing modes. Such pump would deliver water at a high pressure when a higher counter-pressure is generated by the integral product-outlet wall 7 until rupture of the latter.

In other embodiments and preferably a control system can be provided to modify at least one operating parameter of the pump, such that the latter will operate in the correct mode depending upon the position taken by the capsule 1 in the brewing chamber 15. In one embodiment control of the pump can be performed manually by the user. The user could for example activate a bottom or a touch screen to control the pump depending upon the position in which he placed the capsule 1 in the brewing chamber 15.

In some preferred embodiments, however, the pump control is made automatically. This can be obtained through the tag 11T formed by the rim 11 projecting sideways asymmetrically from the capsule as disclosed above.

The tag 11T will be positioned in one or the other of two alternative angular positions depending on how the capsule 1 is introduced in the brewing chamber 15.

Since in the embodiment shown in the drawings the tag 11T projects from the capsule on the side where the second wall portion 17B is arranged, the tag 11T will project beyond the recess 17 on the side were the first piercing member is arranged if the capsule 1 is introduced in the receptacle 17 in the position shown in FIG. 5. If, conversely, the capsule is introduced in the receptacle 17 of the brewing chamber 15 such that the first wall portion 7A contacts the first piercing member 27, the tag 11T will project sideways from the recess 17 on the side opposite the one where the first piercing member 27 is located.

Figure 4A:
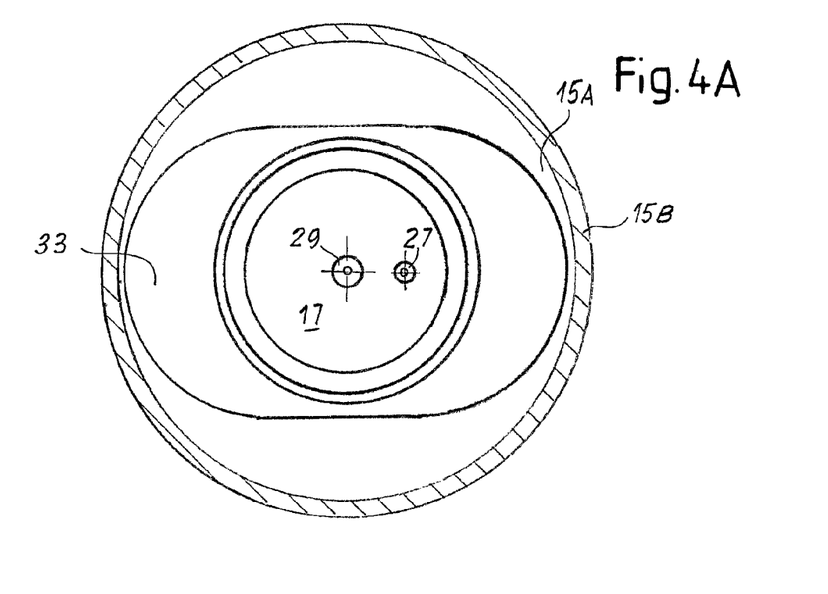
FIG. 4A illustrates a local top view along line IVA-IVA of FIG. 4.

A shallow recessed area 33 can be provided around the recess 17, such that the rim 11 of the capsule 1 can be received in such shallow recess 33 upon closure of the brewing chamber 15. The shape of the shallow recess 33 is best shown in FIG. 4A.

The tag 11T can therefore be placed in either one of two positions corresponding to two alternative positions of the capsule 1.

The brewing chamber portion 15 comprises a sensor 35. The sensor 35 can be a capacitive sensor, an optical sensor, a micro-switch, or any other kind of sensor. The sensor 35 is located in a position corresponding to one of the two extensions of the shallow recess 33, and can detect whether the tag 11T is located in that portion of the shallow recess 33 or not. In the position of FIG. 4, for example, the sensor 35 senses the presence of the tag 11T, while in the position of FIG. 5 the sensor 35 detects the absence of the tag 11T.

The sensor 35 generates a signal, which can be used by a control unit for automatically setting one or more operating parameters of the pump. For example, if the sensor 35 detects the tag 11T, this means that the capsule 1 is in the position shown in FIG. 4 and that the pump shall deliver a higher water rate at a lower pressure. If the sensor 35 delivers a signal of "tag absent" as in the case of FIG. 5, the pump will be controlled to deliver a smaller water rate at a higher pressure.

Figure 6:
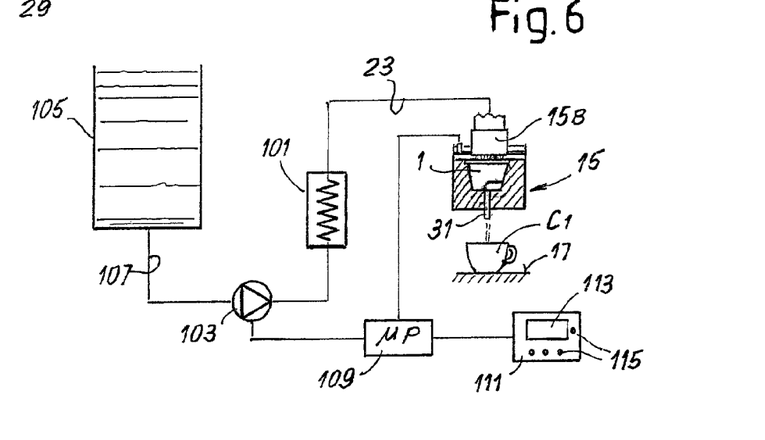
FIG. 6 illustrates a diagram of the main components of a beverage producing device.

In FIG. 6 the main components of a coffee producing device 100 are schematically shown. The brewing chamber 15 is connected through pipe 23 to a water heater 101, for example a through-flow heater. The brewing water is pumped by a pump 103 from a water container 105 through a suction pipe 107, the water heater 101 into the brewing unit 15. In the example shown the pump 103 is interfaced with an electronic control unit 109. Reference number 111 schematically designates a user interface, comprising for example a display or a touch pad 113, one or more knobs, switches or the like, schematically shown at 115. In FIG. 6 a cup C1 is shown positioned on a drip tray 117 located under the coffee dispensing spout 31 to collect the beverage produced by the coffee producing device 100.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A capsule containing at least one ingredient for preparing an edible product by flowing water there through, said capsule comprising:
   a water-inlet wall; and
   a product-outlet wall; and
   at least one ingredient for preparing the edible product within the capsule,
   wherein said product-outlet wall comprises at least a first wall portion configured to be pierced, a second wall portion configured to be pierced, said second wall portion being recessed with respect to said first wall portion, and a third wall portion that is inwardly curved into the capsule and joins the first wall portion to the second wall portion, the capsule further comprising a first sidewall portion extending from the first wall portion to the water-inlet wall, and a second sidewall portion that is opposite of the first sidewall portion with respect to the water-inlet wall, the second sidewall portion extending from the second wall portion to the water-inlet wall,
   wherein said product-outlet wall is asymmetrical with respect to a longitudinal plane that extends through a center of the capsule and separates the first wall portion from the second wall portion, and
   wherein the second wall portion is configured to be pierced by a piercing member when the second wall portion expands under a pressure in the capsule, the edible product being configured to flow out of the capsule once the second wall portion is pierced by the piercing member when the second wall portion expands under the pressure in the capsule.

2. The capsule according to claim 1, wherein said second wall portion extends in a central area of said product-outlet wall.

3. The capsule according to claim 2, wherein the longitudinal plane of said capsule intersects said third wall portion.

4. The capsule according to claim 1, having two alternative positions of use, defined by a mutual position of said first wall portion and said second wall portion in a brewing chamber, wherein the two alternative positions of use differ by a rotation of the capsule by a 180 degrees about the longitudinal plane.

5. The capsule according to claim 1, wherein said first wall portion and said second wall portion are arranged side-by-side along a transverse direction of the capsule transverse to the longitudinal plane.

6. The capsule according to claim 1, wherein the product-outlet wall is formed entirely by said first wall portion, said second wall portion and said third wall portion, the second wall portion being entirely recessed with respect to said first wall portion.

7. The capsule according to claim 1, wherein said first wall portion is substantially orthogonal to the longitudinal plane of the capsule.

8. The capsule according to claim 1, wherein said water-inlet wall is a pierceable, gas and liquid impervious wall.

9. The capsule according to claim 1, comprising a recognition element, the recognition element being arranged in an asymmetrical position with respect to the longitudinal plane of the capsule.

10. The capsule according to claim 9, wherein said recognition element comprises a tag projecting sideways from the capsule.

11. The capsule according to claim 9 wherein said recognition element is formed on a rim surrounding said water-inlet wall.

12. The capsule according to claim 11, wherein said rim is arranged asymmetrically with respect to said longitudinal plane of the capsule.

13. The capsule according to claim 9 wherein the recognition element is arranged on one side of the capsule, corresponding to one of said first wall portion and said second wall portion.

14. The capsule according to claim 8 wherein said first wall portion, said second wall portion and third wall portion are arranged side-by-side along a transverse direction of the capsule transverse to the longitudinal plane, and wherein said recognition element is aligned with one of said first wall portion and said second wall portion in said transverse direction.

15. A method for producing an edible product with a capsule and a device, the capsule comprising:
   a water-inlet wall;
   a product-outlet wall; and
   at least one ingredient for preparing the edible product by flowing water through the capsule,
   wherein said product-outlet wall comprises at least a first wall portion configured to be pierced, a second wall portion configured to be pierced, said second wall portion being recessed with respect to said first wall portion, and a third wall portion that is inwardly curved into the capsule and loins the first wall portion to the second wall portion, the capsule further comprising a first sidewall portion extending from the first wall portion to the water-inlet wall, and a second sidewall portion that is opposite of the first sidewall portion with respect to the water-inlet wall, the second sidewall portion extending from the second wall portion to the water-inlet wall,
   wherein said product-outlet wall is asymmetrical with respect to a longitudinal plane that extends through a center of the capsule and separates the first wall portion from the second wall portion, and
   wherein the second wall portion is configured to be pierced by a piercing member of the device when the second wall portion expands under a pressure in the capsule, the edible product being configured to flow out of the capsule once the second wall portion is pierced by the piercing member when the second wall portion expands under the pressure in the capsule, and the method comprising acts of:

introducing said capsule in a brewing chamber of the device selectively in a position of introduction, said position of introduction being one of a first position, wherein the first wall portion is pierced by a further piercing member, and in a second position, wherein said first wall portion is arranged opposite said first piercing member;

closing said brewing chamber; and delivering water to said brewing chamber selectively at one of a lower pressure and a higher pressure depending upon the position of introduction of the capsule in the brewing chamber.

16. A capsule containing at least one ingredient for preparing an edible product by flowing water there through, said capsule comprising: at least one ingredient for preparing the edible product within the capsule;
   a water-inlet wall; and
   a product-outlet wall configured to output the edible product,
   wherein said product-outlet wall comprises at least a first wall portion configured to be pierced, a second wall portion configured to be pierced, said second wall portion being recessed with respect to said first wall portion, and a third wall portion that is inwardly curved into the capsule and joins the first wall portion to the second wall portion, the capsule further comprising a first sidewall portion extending from the first wall portion to the water-inlet wall, and a second sidewall portion that is opposite of the first sidewall portion with respect to the water-inlet wall, the second sidewall portion extending from the second wall portion to the water-inlet wall, and
   wherein said product-outlet wall is asymmetrical with respect to a longitudinal plane that extends through a center of the capsule and separates the first wall portion from the second wall portion.

17. The capsule according to claim 16 wherein the second wall portion is configured to be pierced by a piercing member when the second wall portion expands under a pressure in the capsule, the edible product being configured to flow out of the capsule once the second wall portion is pierced by the piercing member when the second wall portion expands under the pressure in the capsule.

* * * * *